E. MAY.
COTTON CHOPPER.
APPLICATION FILED NOV. 7, 1908.
911,739.
Patented Feb. 9, 1909.
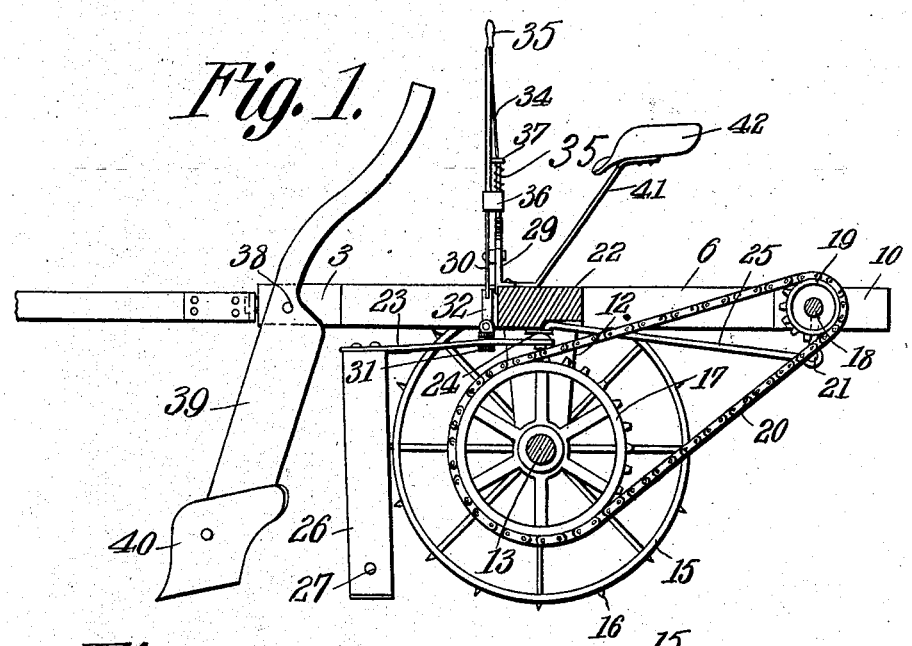
Fig. 1.
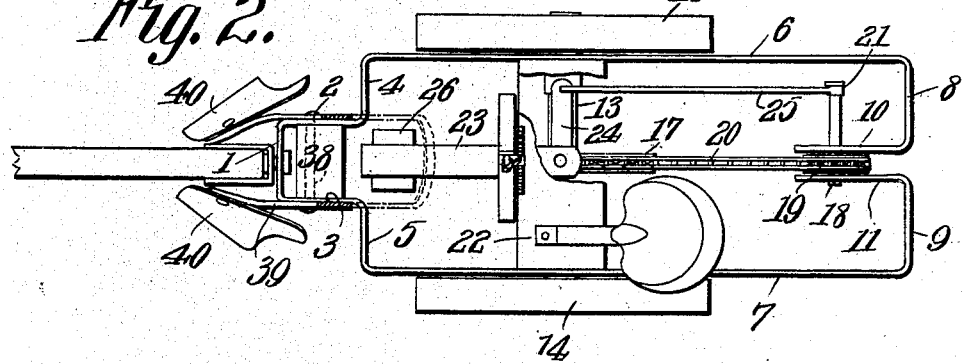
Fig. 2.
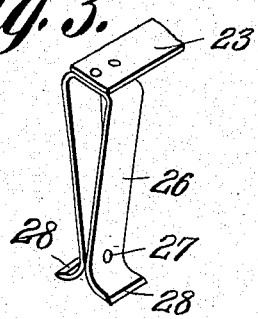
Fig. 3.
Fig. 4.
Witnesses
Inventor,
Elihu May.
By C. A. Snow & Co.
Attorneys

UNITED STATES PATENT OFFICE

ELIHU MAY, OF MAGEE, MISSISSIPPI.

COTTON-CHOPPER.

No. 911,739.     Specification of Letters Patent.     Patented Feb. 9, 1909.

Application filed November 7, 1908. Serial No. 461,557.

*To all whom it may concern:*

Be it known that I, ELIHU MAY, a citizen of the United States, residing at Magee, in the county of Simpson and State of Mississippi, have invented a new and useful Cotton-Chopper, of which the following is a specification.

This invention relates to cotton choppers of that class designed to remove the surplus growth of cotton plants and cultivate the adjacent soil.

One object of the invention is to provide a device equipped with a double edged hoe arranged to oscillate in a horizontal plane.

Another object is to provide an adjustable cultivator or plow attachment which will be within easy reach of the operator, when the latter is seated, in order that it may be raised or lowered without the necessity of bringing the device to a stop.

A further object is to provide a means for vertically adjusting the hoe when the wheels enter soft ground thus preventing any damage of the same. And a still further object is to provide a device having a small number of operating parts, and these so arranged that danger of the same becoming inoperative will be reduced to a minimum.

With these and other objects in view as will more fully hereinafter appear the present invention consists in certain novel details of construction and arrangement of parts, hereinafter fully described, illustrated in the accompanying drawings, and more particularly pointed out in the appended claims, it being understood that various changes in the form, proportion, size and minor details of the device may be made without departing from the spirit or sacrificing any of the advantages of the invention.

In the accompanying drawings, forming part of this specification:—Figure 1 is a longitudinal section view of the device. Fig. 2 is a plan view of the same. Fig. 3 is a detailed perspective of the hoe, and Fig. 4 is a front elevation of the adjusting device for the hoe.

Similar numerals of reference are employed to designate corresponding parts throughout.

In carrying out the invention I provide a frame having depending arms on its opposite longitudinal sides in which are journaled the opposite ends of a shaft or axle. The latter bears a pair of driving wheels which impart rotation to the shaft. Keyed to the shaft or axle is a sprocket wheel, and journaled in the rear of the frame is a shaft to which is keyed a sprocket pinion; connection between the latter and sprocket wheel is established by means of a sprocket chain. One terminal of the shaft bearing the sprocket pinion terminates in a crank arm, and pivoted to the lower face of a cross piece in the middle of the frame is a bell crank lever; connection between one arm of the latter and crank arm is established by means of a suitable pitman. The other arm of the bell crank supports a depending hoe standard provided on its opposite sides at the lower terminal with suitable hoes. Journaled in the front end of the frame is a shaft having secured to its opposite ends a pair of plow standards the lower terminals of which are each provided with the usual plow share.

The frame may be of any suitable material and in the present instance is shown to consist of a single piece of metal, substantially rectangular in cross section bent rearwardly and at right angles on either side of its horizontal center, so as to form a head consisting of a front plate 1, and neck plates 2 and 3. The metal at the terminal of each neck plate is bent outwardly and at right angles to provide shoulders 4 and 5, which terminate in rearwardly bent portions 6 and 7, constituting the longitudinal sides of the frame. The metal adjacent the rear terminal of each side is bent inwardly and at right angles to form legs 8 and 9, the length of each leg portion being equal to the width of the frame, or substantially so, and each bent portion at a point adjacent the terminals of the longitudinal sides 6 and 7 is bent forwardly and at right angles so as to form a pair of feet 10 and 11, disposed on either side of the longitudinal center of the frame. Depending from the central portion of each longitudinal side is a hanger 12 and journaled in each of the said hangers is a shaft or axle 13, the opposite end portions of which project beyond the outer faces of the hangers and frame sides. Loosely mounted on one of the projecting ends of the shaft or axle is a driving wheel 14, and keyed to the opposite end of the shaft is a similar driving wheel 15. Each wheel may be provided with the peripheral spurs 16 to prevent skidding.

Keyed to the central portion of the shaft or axle 13 is a sprocket wheel 17, and journaled in the feet 10 and 11 at the rear of the frame is a shaft 18, having keyed thereto a sprocket pinion 19, in direct alinement with the sprocket wheel 17. Connection between the former and latter is established by means of the sprocket chain 20, which may be of any well known type.

By referring now to Figs. 1 and 2 it will be seen that one terminal of the shaft 18, bearing the sprocket pinion projects beyond the foot plate 10, and is bent laterally for a portion of its length and thence at right angles, forming a crank arm 21. Secured to the opposed inner faces of the sides 6 and 7 are the opposite ends of a cross beam 22, the longitudinal center of which lies in a vertical plane with the longitudinal center of the shaft or axle 13. A bell crank lever having arms 23 and 24 of unequal lengths, is pivotally connected to the lower face of the cross beam 22 directly above the vertical center of the sprocket wheel 17 and connection between the short arm 24 of the bell crank and crank arm 21 of the shaft 18, is made by means of a pitman rod 25 one terminal of which is bent downward to center an opening adjacent the free end of the short arm of the bell crank while the opposite terminal is provided with an eye which loosely encircles the crank arm 21. The terminal of the latter projects a trifle beyond the horizontal plane of the short arm so that when the latter is caused to oscillate in a horizontal plane, by the crank arm rotating in a vertical plane, the length of the latter will be sufficient to permit that end of the pitman encircling the crank arm to move laterally outward without coming off when the short arm has reached one extremity of the arc described by its movement. The long arm 23 of the bell crank is preferably of a single piece of resilient metal the length of which is substantially equal to the distance between the central point of the cross beam 22 and rear end of the head portion of the frame. A suitable hoe standard 26, preferably formed of a single piece of metal bent substantially U-shaped is of a length to extend from long arm 23 to a point adjacent the ground. This standard is provided with a level intermediate portion the length of which is equal to the width of the long arm and is rigidly secured to the lower face and adjacent the terminal of the latter.

The limbs of the standard are adjacent their free ends sprung inwardly and secured together by a rivet 27 and that portion of each limb disposed below the rivet is curved laterally and terminates in a sharpened edge 28. Thus it can be seen when the long arm oscillates a similar movement will be imparted to the hoe the sharp edges of which will cut out plants at the desired intervals. In order to prevent the hoe from entering the ground when the drive wheels move over soft places the following device is employed. A standard 29 is secured to the upper face at the horizontal center and coincident with the front edge of the cross beam 22, and pivotally secured to the outer face of the standard is a lever 30, the lower extremity of which extends to the middle of the cross beam or substantially so. A bracket 31, preferably formed of a single piece of metal is provided with a longitudinal opening, through which extends the long arm 23 of the bell crank, and secured to the upper side and at the center of the bracket is one end of an arm 32 the opposite or upper end of which is pivoted to the lower end of the lever 30. The length of the slot in the bracket 31 will be sufficient to permit the long arm 23 to make a full swing in both directions. An arcuate rack 33, is disposed on the upper face of the cross beam 22 so as to overlie the standard 29, and the lever is provided with a suitable rod 34 terminating at the lower end in a pawl to engage the teeth of the rack 33 and at the upper end is provided with a handle 35. A collar 36 secured to the rod 34 encircles the lever 30. A spiral spring 35' encircles the rod 34 and bears on the upper side of the collar 36. The spring is kept tensioned by an eye bolt 37 secured to the lever and surrounding the rod in position to bear on the upper terminal of the spring, so that when the rod is moved upwardly to disengage the pawl, the collar will slide on the lever, the spring 35' operating to return the pawl to engage the rack when the rod is released. Thus it will be seen when the lever is moved to the right or left of the vertical the bracket and long arm 23 will be raised.

By referring now to Figs. 1 and 2 it will be seen that a shaft 38 has its opposite ends journaled in the neck plates 2 and 3 of the head. The function of this member is to provide a pivotal support for the cultivator attachment to be presently described. A U-shaped standard 39 preferably formed of metal, is designed to straddle the head portion of the frame having the intermediate portion of each limb secured to the terminals of the shaft 38 projecting beyond the neck plates 2 and 3, and disposed on the outer face and at the lower end of each limb is secured a plow share 40. The latter may be of any well known type and the space between each share will be sufficient to permit them to loosen earth on either side of a row of plants. The upper end of the standard 39 is curved rearward so as to be within easy reach of the operator who may by depressing the central portion of the standard elevate the plow shares above the level of the ground. A suitable seat standard 41 has one end secured to the upper face of the cross beam 22 and fitted to the opposite end is a seat 42. Thus it will be seen that I have provided a device exceedingly simple in construction and comparatively inexpensive to manufacture.

What is claimed is:—

1. In a cotton chopper the combination with a wheeled frame, of a bell crank carried by said frame having a resilient arm provided with a depending chopper standard, means connected to said bell crank serving to oscillate the same and said standard in a horizontal plane, and means carried by the frame and connected to said resilient arm serving to raise and lower the latter.

2. In a cotton chopper the combination of a driving axle a frame carried thereby provided at one end with inturned feet parallel with the sides of said frame, a shaft journaled in said feet connected to said driving axle, said shaft terminating at one end in a crank arm, a cross beam carried by said frame, a support connected to said cross beam, a chopper standard depending from said support, and a connection between said crank arm and said support serving to oscillate the same and said standard in a horizontal plane.

In testimony that I claim the foregoing as my own, I have hereto affixed my signature in the presence of two witnesses.

ELIHU MAY.

Witnesses:
C. A. WALKER,
F. E. TEDDER.